Jan. 14, 1947.  S. SCHUMAN  2,414,173
FAN HANGER AND LIKE FIXTURE SUPPORT
Filed Dec. 11, 1943
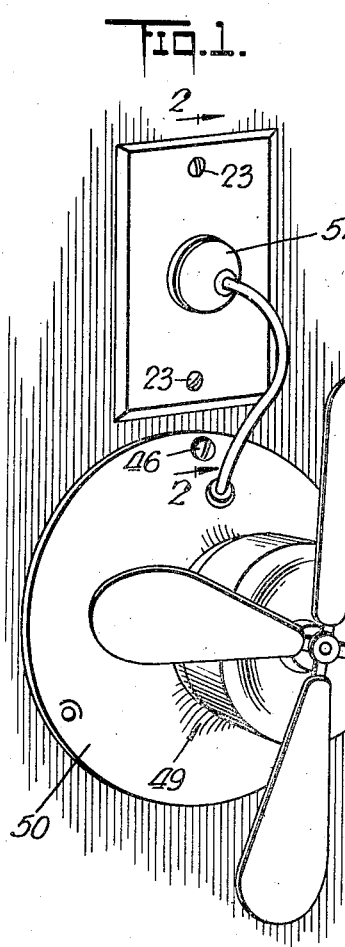
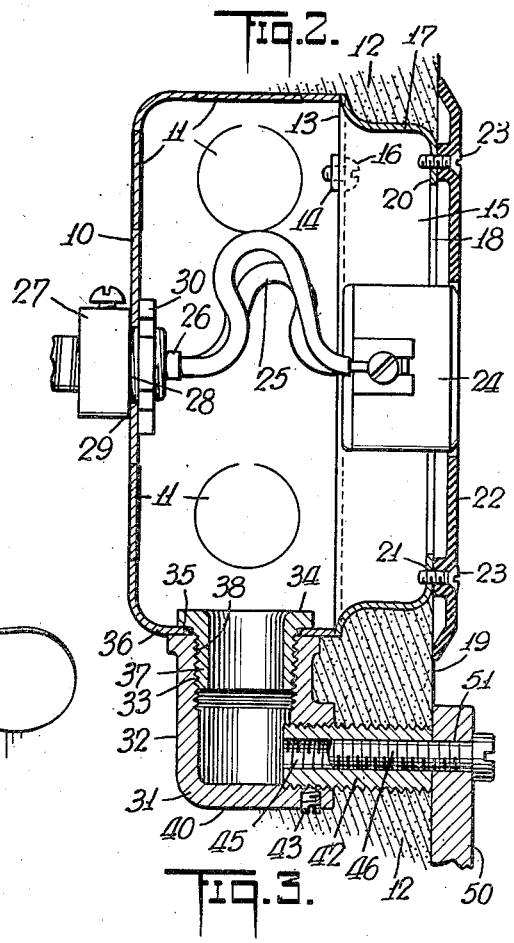
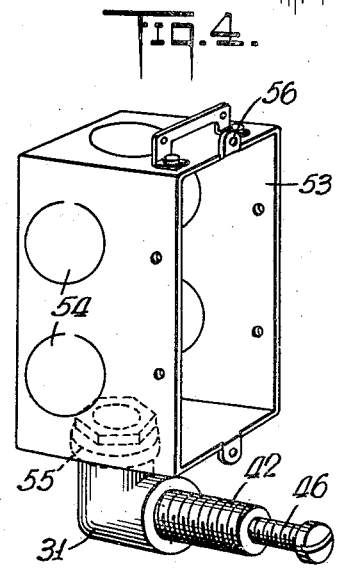
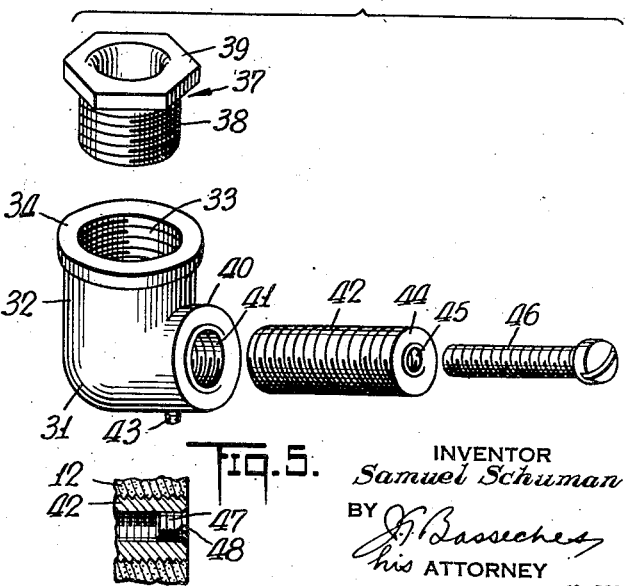
INVENTOR
Samuel Schuman
BY
his ATTORNEY
43-239

Patented Jan. 14, 1947

2,414,173

UNITED STATES PATENT OFFICE 2,414,173

FAN HANGER AND LIKE FIXTURE SUPPORT

Samuel Schuman, New York, N. Y.

Application December 11, 1943, Serial No. 513,977

4 Claims. (Cl. 174—52)

This invention relates to an electrical fixture support, more particularly to a fan hanger support, and still more particularly to a combination fan hanger support and outlet box.

Known to me is the existence of electrical fixture supports specifically serving as combined electrical outlets and fan hangers. In these constructions the electrical outlet for plugging in the connection for the fan are conveniently associated together, so that the physical support for the fan and the outlet connection for the electrical power are closely associated with each other to prevent unsightly appearance and eliminate the labor of mounting special brackets driven into the plaster of the wall to support the fan.

In these constructions the outlet box and cover plate cooperate to support some screw or stud to which or from which the fan or like fixture is suspended and makes bearing contact with the cover plate. As these cover plates do not lie flush with the wall, a limited supporting surface is provided. With the advent of more decorative cover plates, which in part has been necessitated by the shortage of critical metals such as brass, cover plates of glass, plastics and similar fragile materials have come into being, not only of necessity but because of their ornamental qualities. With cover plates for outlet boxes of this character, the outlet hangers, as hereinbefore described, are wholly inadequate to satisfy the rigorous stresses encountered in use. Moreover, where endeavors have been made to transmit the stress upon the fixture from the cover plate to the outlet box, the plug receptacle and the connection to the outlet box occupy so much space as to interfere with the normal and efficient use of the outlet box. Especially is this latter observation true where the outlet or junction box, which is capable of receiving as much as 15 sets of wires, is the intermediate location for distribution of power wherein the presence of the plug receptacle and connectors minimize and unduly limit the use which may be made of the outlet or junction box. Under such circumstances, the crowding of wires or connections for wires within the outlet box and the location of a plug receptacle is a hazardous arrangement, frequently resulting in grounding of live wires, burning out of fuses, not to speak of the fire hazard as an incident thereof.

Accordingly, it is an object of my invention to provide an electrical fixture support, more particularly a fan hanger support and combination outlet in which the stress receiving support is taken up by the outlet box, but the hanger connection is exteriorly disposed with respect to the outlet box.

Still further it is an object of my invention to combine with an outlet box, having the usual "knockout" plugs, a fan hanger support which makes available the knockout plug opening as a means for supporting the electrical fixture, whereby the stress of supporting electrical fixtures, such as fans, are disposed away from the cover plate with many incident advantages, making possible the use of relatively fragile cover plates such as glass or plastic of different colors capable of matching other switch plates; making possible the use of the outlet box for duplex receptacles, one which may be used for the fan or like fixture, and the other for another electrical appliance such as an electric clock or the like; making possible the support of a heavy fixture, such as a fan, by the whole outlet box; making possible the flat contacting engagement between the base of the fan and the wall, which, in the case of existing supports, spaces the fan from the wall by the thickness of the cover plate; making possible full use of the outlet box for wiring connection to the maximum extent and allowing maximum space for making splices and other connections within the outlet box; making possible the use of standard or existing outlet boxes without alteration.

Still further objects of my invention reside in the provision of a fixture support in combination with a fixture anchor and outlet box which is simple in construction and economical in cost.

To attain these objects and such further objects as may appear herein or be hereinafter pointed out, I make reference to the accompanying drawing forming a part hereof wherein:

Figure 1 is a perspective view illustrating my invention in the form of a combination outlet box and fixture hanger for a fan;

Figure 2 is an enlarged section taken on the line 2—2 of Figure 1;

Figure 3 is an exploded perspective view of the anchor portions of my device for attachment to outlet boxes;

Figure 4 is a perspective view showing my device with another form of outlet box;

Figure 5 is a fragmentary sectional view of the sealed anchor sleeve of my device.

Making reference to the drawing, it is contemplated by my invention to combine with a standard outlet box 10 the anchor support constituting the principal feature of my invention. This form of outlet box is of the type including numerous knockout plugs 11 which, in the example illustrated, may contain as many as fifteen knockouts. This form of outlet box is set into the plaster 12 of the wall and has its open face 13 formed with tongues 14 to which an outlet frame 15 may be affixed by screws 16. This frame is formed with a dished throat 17 whose mouth 18 is arranged to lie generally flush with the surface 19 of the wall 12. An inwardly directed flange 20 is formed with screw orifices 21 for mounting the cover plate 22 by screws 23. The cover plate 22 may have mounted thereon a plug receptacle 24 to which the wires 25 coming from the conduit 26 are connected. The cable is affixed by a collar connector 27 gripping the cable on one side and having a flange 28 passing through the knockout 29, and is held in place by the nut 30 engaging the flange 28 previously described.

With the type of outlet box shown I provide an anchor bolt elbow 31 including a branch 32 interiorly threaded at 33. The elbow 31 is formed with an outlet abutting flange 34 so that the orifice 33 may be aligned with the opening at 35 upon severance of the knockout plug found at the lower central axial portion of the wall 36 of the outlet or junction box 10. A bushing 37 having a threaded neck 38 and a hexagonal head 39 is arranged to be disposed through the opening 35 to threadedly engage the neck 38 with the threaded section 33 of the elbow 31. In this position the outlet box wall 36 is clamped between the bushing head 39 and the wall abutting flange 34. The elbow 31 is formed with a branch 40 being threaded at 41 to receive the anchor bolt sleeve 42 which is complementarily exteriorly threaded. A set screw 43 passing through the wall of the branch 40 serves to engage the sleeve 42 to hold the sleeve in adjusted position. The sleeve 42 has its end 44 disposed outwardly in the direction of the surface of the wall and may be extended inwardly or outwardly, depending upon the extension of the mouth 18 of the frame 15, so as to be aligned therewith. When this aligned position is reached, the set screw 43, previously mentioned, is driven home engaging the threaded exterior of the sleeve to fix the sleeve 42 into position. The sleeve 42 is axially threaded at 45 to receive the threaded anchor bolt 46.

The assembly described may be encased in the plaster of the wall prior to insertion of the anchor bolt 46. I prefer, under such circumstances, to protect the orifice 45 with a threaded plug 47, which is provided with the usual screw driver slot 48. With a plug thus affixed in position, the outlet box may be covered with plaster, bringing the plaster flush with the end 44 of the sleeve 42.

This assembly may be left this way, even including the papering or painting operations over the surface 19 of the wall to embrace or cover the plug 47. Should the occupant desire to mount a fixture, such as a fan 49, it is merely necessary to chip the paint or paper at the location where the plug 47 is located, to remove the plug 47. This exposes the orifice 45, permitting the fan to be mounted in position. In the illustration shown, the fan base 50 is formed with an orifice 51 to receive the anchor bolt 46. The anchor bolt 46 is then threadedly mounted within the orifice 45 until the base is moved into engagement with the surface 19 of the wall 12. In the position as shown, it will be observed that the base 50 of the fan 49 lies flush with the plaster and that the entire stress of the weight of this heavy body is taken up by the elbow 31 and its anchoring engagement with the outlet box 10. Rigid support is thereby provided without reliance upon the outlet cover plate 22. This permits the cover plate 22 to be made of any desirable ornamental material and need not be of critical material such as brass, as the cover plate does not receive the weight or pressure of the fan. This permits the use of cover plates of glass or plastics, without limitation of standard construction matching similar switch plates which may be used in the locality.

The transposition of the anchor to the exterior of the outlet box permits free use of as many of the knockout plugs as desirable, with freedom for performing the splicing operations without danger of being cramped by the outlet plug receptacle 24. This construction likewise permits the use of a cover plate from which there may be disposed twin plug receptacles, one to serve as the connection for the plug 52 for the fan, the other (where used, not shown) for some other electrical contrivance such as an electric clock or lighting fixture. The suspension of the fan 49 against the wall permits access to the outlet box to manipulate the splices or connections within the outlet box with freedom, especially where the outlet box is merely the transfer point for cables branching out to various localities in the building.

While I have shown and described in Figure 2 my support in connection with an outlet box which might be a junction box at any point in the wall, it will be understood that my attachment is readily available for most any receptacle box to be found at the present time on the market. In Figure 4 I have illustrated a standard receptacle box 53 normally used for mounting switches and likewise having a plurality of knockout plugs 54. In this assembly, the lowermost axial opening 55 may be conveniently used to apply the attachment 31 with its connecting bushing 39, sleeve 42 and anchor bolt 46 in the manner already described in connection with the embodiment illustrated in Figure 2. This type of box has the standard cover plate accessory tongues 56 for holding switch plates or a combination switch plate and plug receptacle. This form of outlet box amply illustrates one of the features of my invention wherein a relatively small receptacle box, normally designed snugly to receive the receptacle for plug or switch, may be converted to a fixture support without in any way interfering with the usual functions of this box, which ordinarily is so cramped for space as to make it impossible to support the usual anchor bolts which heretofore have been disposed from the cover plate.

While I have shown and described a junction outlet box and a receptacle outlet box for combination with the features of my fixture support, it will be understood that these outlet boxes are purely illustrative and that there are other standard outlet boxes with which my support may be readily used to provide a rigid fan hanger or like electrical appliance.

Having thus described my invention and illustrated its use, what I claim as new and desire to secure by Letters Patent is:

1. In a fan hanger including a junction box to be covered by a cover plate to be flush with the plaster for providing a plug receptacle connection for the fan, and having side wall, knock out openings, the combination therewith of an elbow bracket, one branch of which is aligned with an opening of said box and has nested therein the neck of a flanged element which extends into one of said side wall openings to bind the side wall between the flange and the said branch, the other branch having nested therein a sleeve having means engaging said branch extending the sleeve adjustably inwardly and outwardly, with its free end faced in the direction of the cover plate, to permit positioning flush with the wall in which the box is embedded, thereby forming an abutment for the base of the fan, said sleeve being interiorly threaded to receive a threaded anchor bolt to hold said fan base in contact with the free end of said sleeve, and thereby with the wall supporting the box when embedded therein, thereby leaving the box and opening free for wiring and receptacle mounting.

2. In a fan hanger including an outlet box arranged to be encased in the plaster of a wall to be covered by a cover plate flush with the surface of the plaster and for providing a plug receptacle connection serving as the current connection of power for the fan and having side wall knock-out openings, the combination therewith of a bracket, one end of which is aligned with an opening of a side wall and having a flanged element extending from said side wall and nested within said branch to lock said bracket to said side wall of said box, the other end of said bracket extending exteriorly of said box and being threaded, a threaded sleeve for engaging said second branch for adjusting said sleeve inwardly and outwardly within said second branch, said sleeve being threaded to receive a fan anchor bolt extensible beyond the end of the cover plate, said sleeve providing an abutment cooperating with the surface of the plaster, when the box is embedded therein, thereby to form a support for the base of the fan, said abutment end of the bracket forming a variable mounting for wide range adjustment of said end in accordance with the thickness of the wall of the plaster in which the box is to be embedded.

3. In a fan hanger including an outlet box arranged to be engaged in the plaster of a wall, to be covered by a cover plate flush with the surface of the plaster for providing a plug receptacle connection serving as the current connection of power for the fan and having side walls formed with knock-out openings, the combination therewith of a bracket comprising a tubular elbow, one end of which is aligned with a side knockout opening, a bushing having a flanged portion extending through said opening into said branch, clamping said elbow exteriorly of said box, the second branch of said elbow having means to receive a sleeve and cooperating with means on said sleeve to extend said sleeve within said branch adjustably outwardly, with the free end of the sleeve forming a fan base abutment substantially flush with the position of the cover plate whereby said abutment may be arranged flush with the surface of the plaster in which said box may be encased, said sleeve being interiorly threaded to receive a threaded anchor bolt, and means for locking said sleeve and said branch in predetermined adjustable positions, the sleeve and branch thereby providing means for supporting the fan base in accordance with the thickness of the wall plaster in which the box is to be encased.

4. In a fan hanger including a box to be encased in the plaster of a wall to be covered by a plate flush with the surface of the plaster for providing a plug receptacle connection serving as the current connection of power for the fan and having knock-out openings through which a plurality of wires may be directed to within the confines of the box, the combination therewith of a bracket, one end of which has means passing through a knock-out opening and engaging the side wall for locking the bracket with said box, the other end of which bracket extends exteriorly of said box to be embedded in the plaster of the wall, said last mentioned edge having a threaded portion, a threaded sleeve engaging said threaded portion of said bracket thereby to mount said sleeve adjustably inwardly and outwardly from the second end of said bracket, and providing an abutment which may be adjusted flush with the surface of the plaster of the wall, said sleeve being internally threaded to receive a threaded anchor bolt extensible beyond the abutment end thereof, the abutment of the sleeve cooperating with the plaster of the wall in which the box is to be encased for holding said fan in contact with the wall surface, said abutting end of said sleeve providing a wide range of adjustment of said free end in accordance with the thickness of the wall of the plaster in which the box is to be encased.

SAMUEL SCHUMAN.